12,759,584

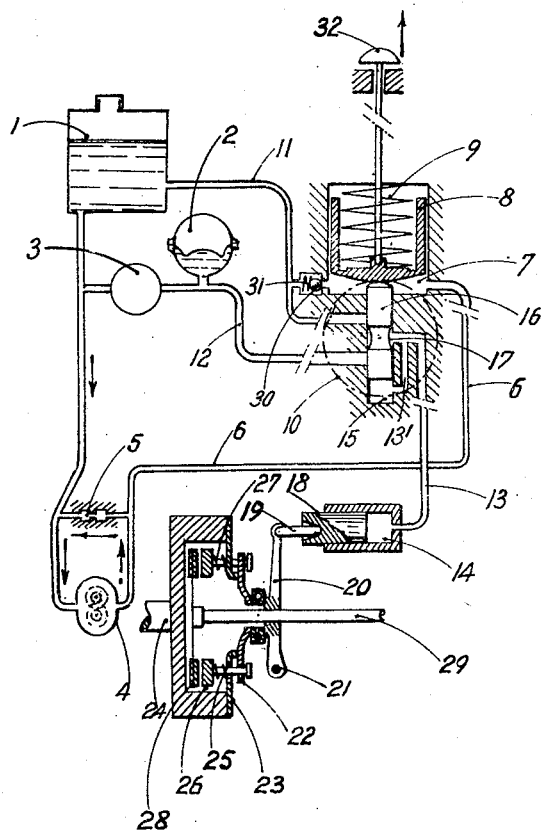

Patented Aug. 21, 1956

2,759,584

HYDRAULICALLY OPERATED AUTOMATIC CLUTCH CONTROL DEVICE FOR AUTOMOBILE VEHICLES

Antoine Brueder, Paris, France, assignor to Societe Anonyme Andre Citroen, Paris, France, a corporation of France Application December 17, 1953, Serial No. 398,818

Claims priority, application France December 24, 1952

7 Claims. (Cl. 192—91)

This invention relates to a hydraulically operated control device for automatically effecting the engagement and disengagement of a friction clutch of an automobile engine, in a progressive manner such as is normally required for these operations.

In order to enable these engaging and disengaging operations to be correctly carried out, it is necessary for the engine to be completely disconnected at a speed slightly greater than the idling speed, and to be completely engaged at a speed of the order of 1,200 R. P. M., for example. Between these two limits, there is an intermediate zone in which the operation must be effected very progressively. The pressure of the clutch springs on the clutch disc should therefore be a function of the speed of rotation of the engine, without involving jerks or a time lag.

A control device made in accordance with the present invention comprises one hydraulic circuit including means for acting on the clutch springs in order to disengage the clutch, and a distributor controlled by a second hydraulic circuit placed under pressure by a pump which is actuated by the engine and is arranged so that the delivery pressure is proportional to the speed of rotation of the engine, the arrangement being such that according to the speed of the engine the distributor places the member of the first circuit acting on the clutch in communication either with a pressure accumulator in order to disengage the clutch, or with a liquid reservoir in order to enable the engagement to be effected by the action of the clutch springs.

According to a preferred form of construction, the distributor, connected to a reservoir under pressure, to a tank of liquid, and to a cylinder fitted with a piston acting by a suitable arrangement of levers on the clutch springs, comprises a slide valve, one end of which is subject to the pressure prevailing in the said cylinder and the other end of which bears against the bottom of a movable piston subjected on the one side, to the action of a compression spring, and, on the other side, to the action of the fluid delivered by the pump operated by the engine.

According to a more particular feature of the invention, there is provided in parallel, on the delivery side of the pump circuit, a restriction or jet, so that the delivery pressure obtained is strictly proportional to the engine speed.

Other features and advantages of the invention will be explained in the following description of the constructional form of the invention illustrated diagrammatically and by way of example only in the accompanying drawing.

As shown in the drawing, the apparatus comprises a reservoir or tank 1 of liquid supplying on one side a pressure accumulator 2, through the intermediary of a pump 3, and on another side a pump 4 operated directly by the engine, the arrangement being such that its delivery pressure is proportional to the speed of rotation of the engine. To this end, there is provided a jet 5 mounted in parallel with a pipe 6 connecting the pump 4 to a cylinder 7. The cylinder 7 contains a piston 8 and a compression spring 9 acting on one surface thereof. The other surface of the piston is exposed to the pressure of the fluid compressed by the pump and passing through the pipe 6.

Below the cylinder 7 is disposed a distributor 10 connected to the reservoir 1 by a pipe 11, to the accumulator 2 by a pipe 12, and finally to a cylinder 14 by the pipe 13. The distributor is constituted by a body having a bore 15 communicating with the pipes 11, 12, 13 above referred to, and having a slide valve 16 slidably mounted therein. The slide valve 16 is of cylindrical shape, the central part 17 being of reduced diameter by means of which either the pipes 12 and 13 or the pipes 11 and 13 can be placed in communication, according to the position of the valve. The latter bears permanently, as will be explained hereafter, against the bottom of the piston 8, the upper part of the bore 15 communicating with the cylinder 7, and its lower part with the pipe 13, by means of a by-pass 13'.

In the cylinder 14 is slidably mounted a piston 18, with its rod 19 bearing on the end of a lever 20 pivotally mounted on a fixed pin 21. The central part of this lever 20 bears on a ring or oscillating arms 22, which, in their turn, bear on the rim of a ring 23 rigidly connected with the primary shaft 24. The ends of the arms 22 cooperate with rods 25 fixed to the clutch disc 26 on which act the springs 27 bearing on the ring 23. Facing the disc 26 is a second clutch disc 28 rigidly connected with the secondary shaft 29.

A one way valve, comprising a ball 30 pressed by a spring 31, is disposed between the cylinder 7 and the pipe 11 passing to the reservoir, in order to limit the pressure prevailing in the cylinder 7 to a given value.

Finally, in order to provide, if desired, for starting by pushing the vehicle, a draw bar 32 is fitted to overcome the action of the spring 9.

The operation of the device above described is as follows:

Assuming the engine has stopped, the pressure of the pump 4 will be zero, and the spring 9 of the piston 8 will press into the bottom position the slide valve 16 of the distributor 10, thereby placing the hydraulic accumulator 2 in communication with the cylinder 14 of the piston 18 actuating the clutch lever 20, as a result of which the arms 22 pivoting on the ring 23, exert a pull on the rods 25 holding the disc 26 back against the action of the springs 27. The clutch elements are then in the disengaged position.

As soon as the engine is started, a pressure is set up in the delivery pipe 6 of the pump 4. The dimensions of the jet 5 and the characteristics of the spring 9 are so designed that, under the action of this pressure, the piston 8 is pressed back (at approximately 800 R. P. M. for example), by an amount sufficient for the slide valve 16, the bottom of which is subject to the pressure prevailing in the pipes 12 and 13, and therefore to that exerted by the clutch springs 27 in the cylinder 14, to close the communication between the accumulator 2 and the piston 18, and begin to place this latter in communication with the return to the reservoir 1, that is to say in position to initiate the engagement of the clutch.

When the engine is accelerated, the pressure supplied by the pump 4 increases and the exhaust of liquid from the cylinder 14 continues, under the action of the clutch springs 27.

If the engine has a tendency to slow down as a result of the increase in the opposing torque, the reverse phenomenon is produced, i. e. the pressure falls below the piston 8, the latter drops under the action of the spring 9, the slide valve is brought into the position for disengaging the clutch.

As soon as the speed of the engine is sufficient, the piston 8 is completely pressed into the top position and the pressure in the cylinder 14 becomes zero. The clutch no longer slides.

In order to describe the operation further it must first be observed that the bottom of the slide valve 16 is in communication through the by-pass 13' with the pipe 13 supplying the clutch disengaging cylinder 14, and receives therefore a thrust from bottom to top which is a function of the tension of the clutch springs. As on its upper surface it receives a thrust which is strictly a function of the engine speed, there is constantly produced a position of equilibrium which permits rapid disengagement, when the engine has a tendency to stall, and which permits a more or less progressive engagement according to the speed with which the accelerator of the engine is operated.

In some particular cases it is of advantage to start an engine by allowing the vehicle to free-wheel down a gradient, or by pushing or towing it, and, contrary to the case of a centrifugal clutch, this is made possible with the device according to the invention. It is only necessary, when the engine speed is considered to be insufficient, to pull on the rod 32 in order to eliminate the action of the spring 8.

I claim:

1. A hydraulically-operated control device for automatically effecting the selected engagement and disengagement of a friction clutch in a motor vehicle comprising, in combination, a first hydraulic circuit including a source of fluid, a first pump and a pressure accumulator, and clutch-control means acted upon by the fluid in said circuit for disengaging the clutch when said fluid under pressure is in communication with said clutch-control means, said clutch being normally engaged under the action of springs and said clutch-control means effecting disengagement of the clutch against the action of said springs, a second fluid circuit connected with said hydraulic fluid source, said second circuit including a second pump driven by the engine of the motor vehicle to provide a delivery pressure in said second circuit proportional to the speed of the engine, a distributor associated with said first circuit for controlling the flow of fluid to said clutch-control means, and distributor-control means normally acting upon said distributor to provide communication between said first circuit and said clutch-control means, said second circuit communicating with said distributor-control means to actuate said distributor-control means to release said distributor to close the path of communication between said first circuit and said clutch-control means whereby said clutch is engaged upon increase of fluid pressure in said second circuit.

2. A hydraulically-operated control device as defined in claim 1, further comprising means defining a calibrated passageway in parallel with said second pump.

3. A hydraulically-operated control device as defined in claim 1, wherein said distributor-control means includes a cylinder in communication with the outlet of said second pump and a spring-pressed piston slidably mounted in said cylinder and normally urged against the pressure of the fluid from said second pump.

4. A hydraulically-operated control device as defined in claim 3, wherein said distributor comprises means defining a cylinder chamber communicating with said distributor-control cylinder and a cylinder slide valve slidably axially in said distributor cylinder, one end of said slide valve being engageable with said spring-pressed piston, and conduit means connecting said distributor cylinder with said source of fluid, said pressure accumulator and said clutch-control means.

5. A hydraulically-operated control device as defined in claim 1, wherein the clutch-control means comprises a cylinder communicating at one end with said first circuit, a piston slidable in said cylinder, and a lever arm connected with said piston for acting upon said clutch, said lever disengaging said clutch against the pressure of the clutch springs when said piston is urged forwardly in response to fluid pressure in said cylinder.

6. A hydraulically-operated control device as defined in claim 4, wherein said slide valve is provided with a restricted central portion for providing communication between said accumulator and said clutch-control means when said slide valve is in its lowermost position and wherein said slide valve provides communication between said accumulator and said clutch-control means when said slide valve is in its uppermost position.

7. A hydraulically-operated control device as defined in claim 3, further comprising manual release means for eliminating the spring pressure on the piston of the distributor-control means.

References Cited in the file of this patent

UNITED STATES PATENTS 1,999,366    Maybach   ---------------- Apr. 30, 1935

FOREIGN PATENTS 570,236    France ------------------ Jan. 14, 1924